Figure 1:
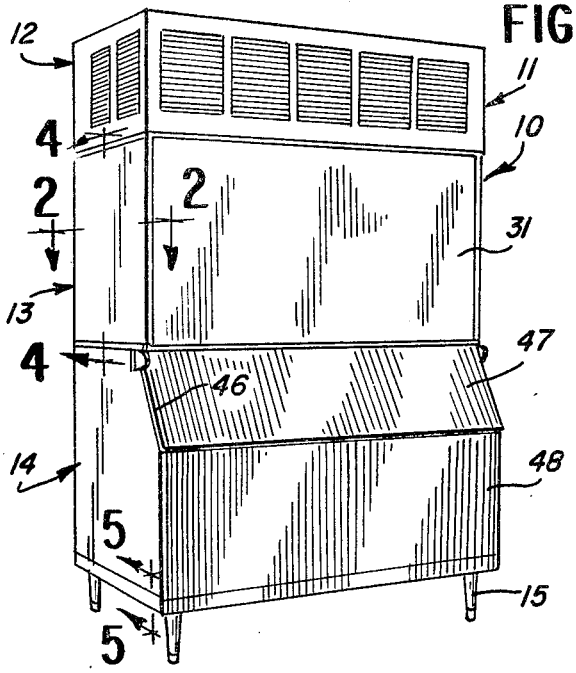
Figure 3:
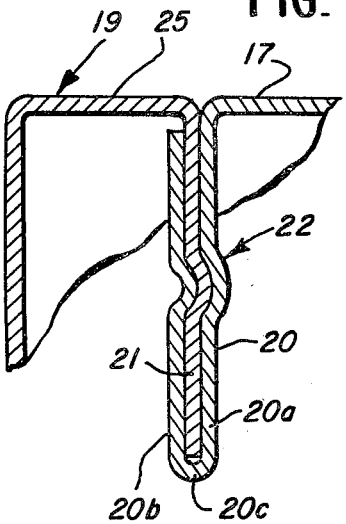
Figure 2:
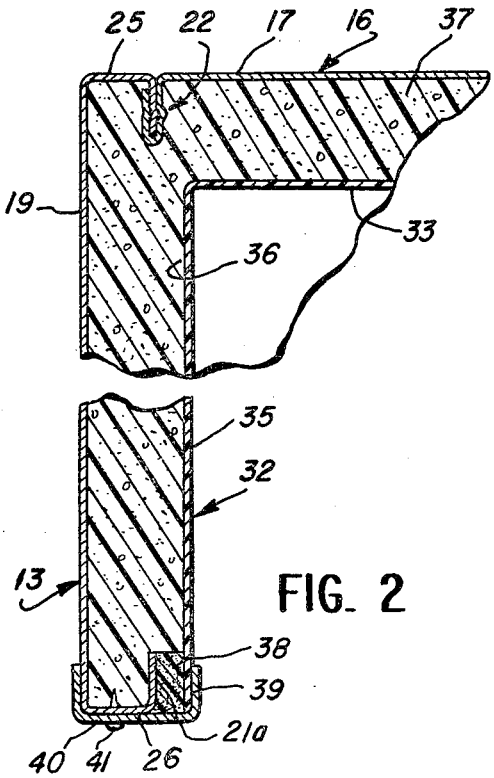
Figure 4:
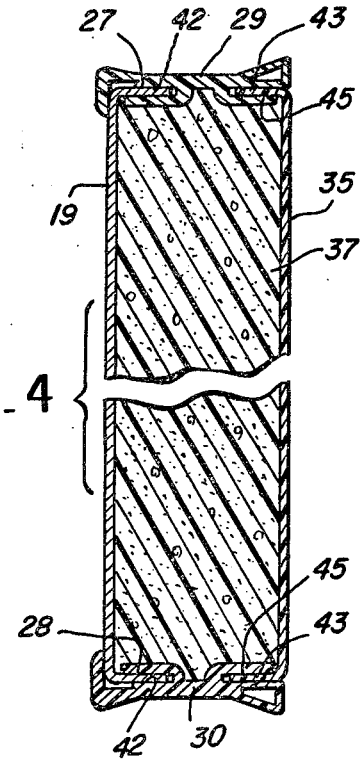
Figure 6:
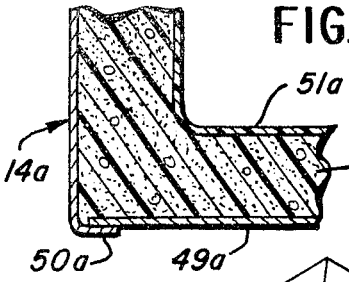
Figure 5:
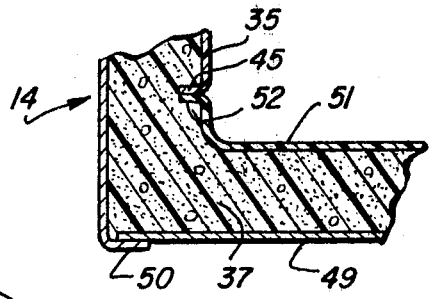
Figure 7:
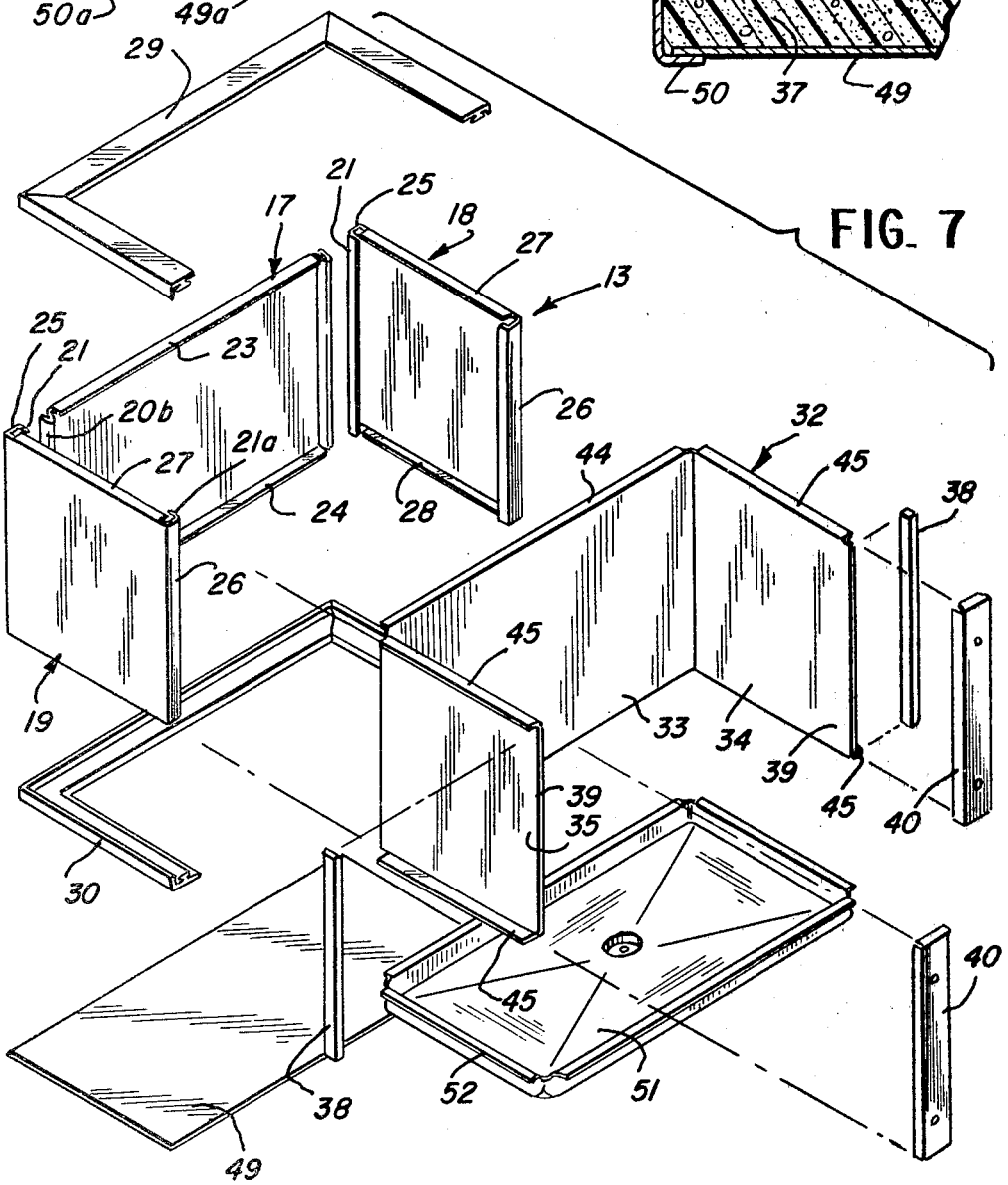

United States Defensive Publication [19] (H) [11] T104,002

Morrison et al. [43] Mar. 6, 1984

[54] MODULAR INSULATED CABINET CONSTRUCTION

[76] Inventors: John F. Morrison, 3151 W. Owasso Blvd., St. Paul, Minn. 55112; Harold E. Jensen, 1016 Island Lake Ave., Shoreview, Minn. 55112; Donald F. Gode, 3538 Glenarden Rd., St. Paul, Minn. 55112

[21] Appl. No.: 334,748

[22] Filed: Dec. 28, 1981

Related U.S. Application Data

[63] Continuation of Ser. No. 71,351, Aug. 29, 1979.

[51] Int. Cl.[3] ..... A47B 81/00

[52] U.S. Cl. ..... 312/214; 312/257 SM

[57] ABSTRACT

An insulative cabinet construction having a shell portion formed of a plurality of panels having securing portions interlocked in secured relationship. A liner is spaced inwardly of the shell structure, and foamed-in-place insulation is formed between the shell structure and liner so as to be adhered to the shell structure and liner and effectively embed the securing portions of the shell to maintain the interlocked secured relationship thereof. The interlocked portions of the shell may be crimped portions, staked portions, or stamped-together portions, as desired. The shell panels may include flanges on edge portions to provide column strength at the corners of the cabinet. The shell panels may be prefinished. Preformed closure means are provided extending between the liner and shell structure outwardly of the insulation.

10 Claims, 2 Sheets Drawing,

22 Pages Specification

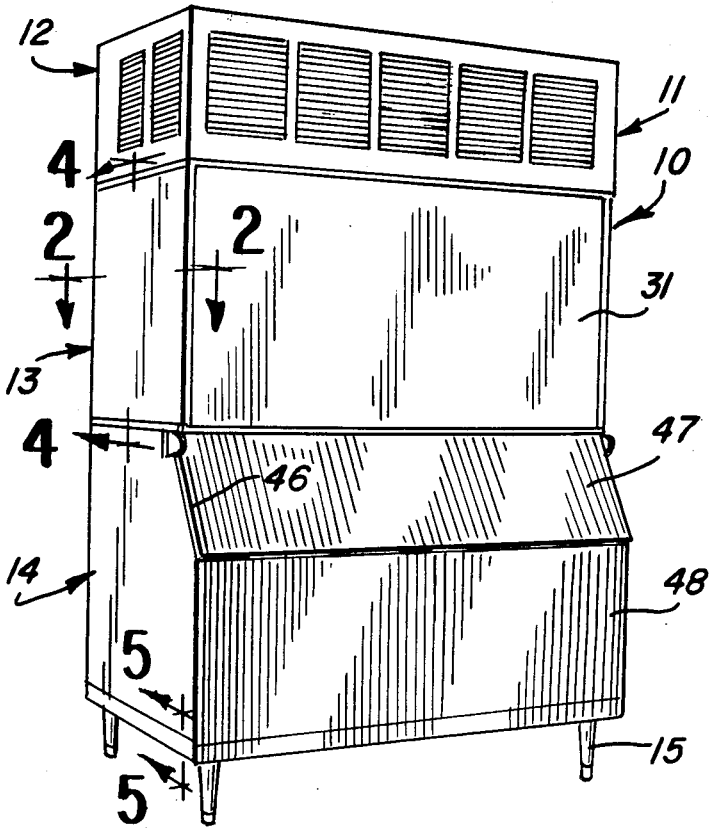

The file of this unexamined application may be inspected and copies thereof may be purchased (849 O.G. 1221, Apr. 9, 1968).